Dec. 2, 1958 L. PÉRAS 2,862,723
STEERABLE WHEEL PIVOT ASSEMBLY
Filed June 1, 1956 2 Sheets-Sheet 1
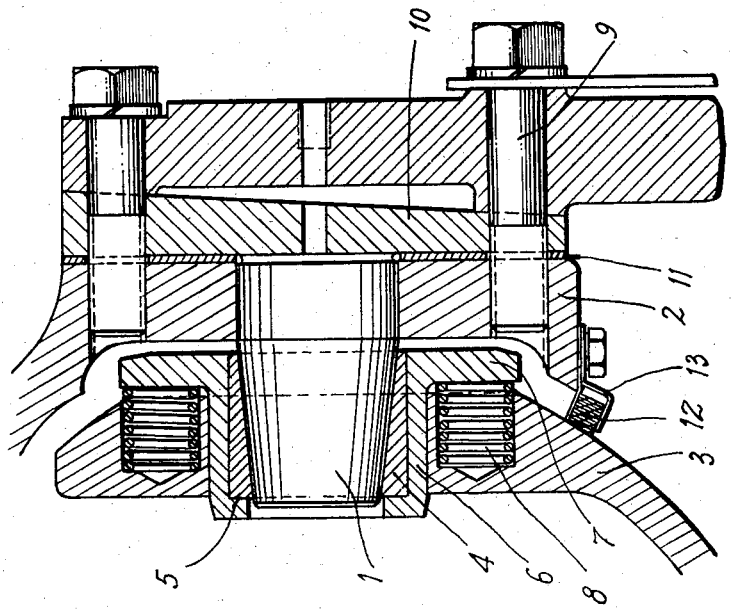
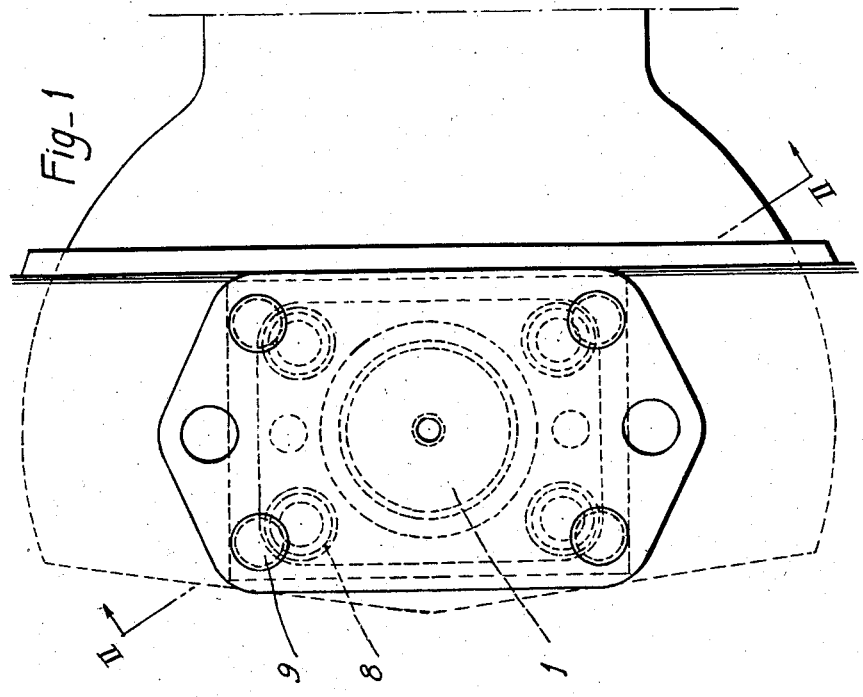

United States Patent Office 2,862,723
Patented Dec. 2, 1958

2,862,723

STEERABLE WHEEL PIVOT ASSEMBLY

Lucien Péras, Billancourt, France, assignor to Regie Nationale des Usines Renault, Billancourt, France, a French works Application June 1, 1956, Serial No. 588,829

Claims priority, application France June 9, 1955

4 Claims. (Cl. 280—96.1)

The invention relates to the steering of vehicles and is concerned more particularly with a construction of a steering pivot assembly having an arrangement for automatically taking up play and braking oscillations of its pivot pins so as to limit the phenomenon of swinging of the wheels.

The arrangement for automatically taking up play and for exerting a partial damping effect is essentially constituted by the use of a frusto conical pin which engages with a sleeve having internal bearing surfaces of the same shape resting in a bearing or support comprising a sleeve housing provided with a shoulder formed by inwardly disposed radial surfaces comprising a flange, and is subjected to the action of springs radially disposed relative to the pin and sleeve housing and themselves housed in an axle casing disposed to bear an outwardly directed radial surfaces of the sleeve housing and which thus tend to displace the said sleeve-carrying support axially for taking up the play of the pin automatically.

Where appropriate, there can be provided, in combination with the aforesaid system for automatically taking up play, a second device for damping oscillations which consist of a shoe mounted in a clamp fixed to the body of the steering swivel and rubbing against the body of the axle. This system has a sealing effect in all cases.

One embodiment of the invention is illustrated in the accompanying drawings.

Fig. 1 is a plan view of the axle assembly comprising the pivot;

Fig. 2 is a partial sectional view through the axis of the pivot pin assembly on the line II—II of Fig. 1;

Figure 3:
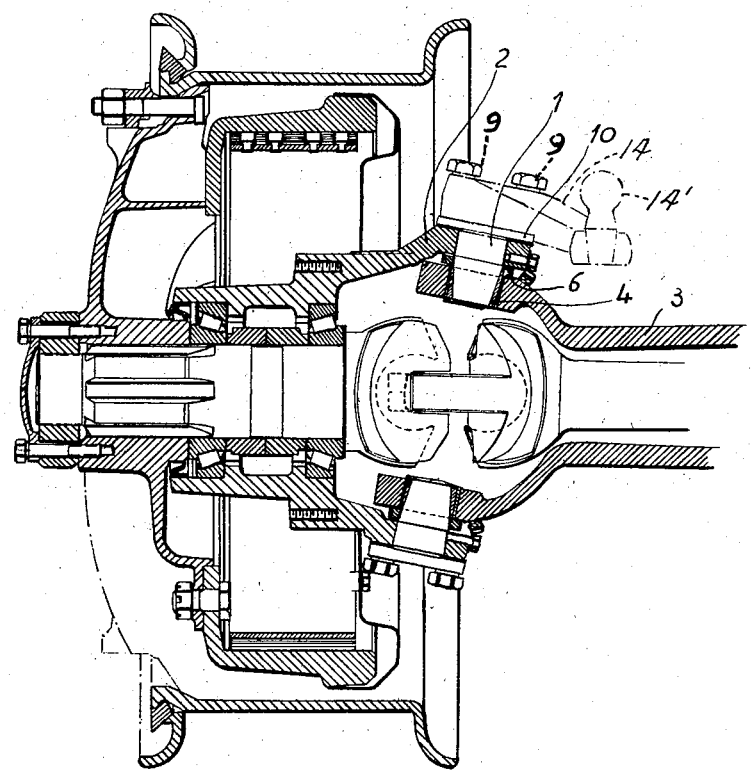
Fig. 3 is a vertical sectional view of a front axle casing of a vehicle showing a front or steerable wheel pivot assembly provided with the invention.

Referring now to the drawings of which Figs. 1 and 2 show only the upper pivot pin, it will be seen that the pivot pin 1 of the steering swivel 2 on the axle casing 3 is conical or at least has a tapered portion as shown; the said pin 1 is fitted into a sleeve 4 providing bearing surfaces for the tapered portion of the pin of corresponding conical shape and bearing against a shoulder 5 of a support casing 6 whose upper flange 7 bears against coil springs 8 whose other ends bear against the body of the axle 3 forming a fixed support. The conical pin 1 is secured by the bolts 9 to the steering swivel 2. A tensioned plate 10 having an inclined joint line, determining its flexure characteristics, transmits the pressure of the bolts 9 through an adjusting shoe 11. It will be understood that by taking up on the bolts 9 the tensioning on plate 10 can be controlled or set as well as determining or setting the compression of the springs. Accordingly, the dampening characteristics of the assembly are set upon assembly and are automatically maintained by the springs which compensate for wear.

By means of this arrangement, the play of the conical pin is automatically taken up since the springs 8, which are compressed at the time of assembly, are adapted to expand towards the flange 7 of the support 6, tending to displace the said support and the conical sleeve 4 in the appropriate direction for always maintaining the sleeve 4 in engagement with the pin 1 without play.

The damping device provided in association with the aforesaid arrangement for damping and taking up play comprises a shoe 12 which is fixed in a clamp 13 carried by the steering swivel 2 and rubbing against the body of the axle 3.

As shown in Fig. 3, a steering arm 14 carrying a ball 14' for connection to the tie-rod is secured on the steering swivel 2 by the bolts 9.

While the invention has been described with respect to the upper pin 1 of the assembly, it will be understood that the lower pin may be provided with the invention, in the manner shown in Fig. 3.

I claim:

1. In a steering pivot assembly for motor vehicles the combination comprising a tapered pin of the assembly, a sleeve disposed on said pin on a tapered portion thereof and having internal surfaces corresponding to the tapered portion of the pin thereby forming bearing surfaces for said tapered portion, an axle casing, a displaceable housing for said sleeve carried by said axle casing and having inwardly directed radial surfaces bearing on one end of said sleeve for moving it axially to the pin and having other outwardly directed radial surfaces at an end opposite to said inwardly directed radial surfaces, a plurality of spaced, normally compressed springs housed in said axle casing and disposed radially to the pin and sleeve housing, the springs being disposed so as to bear against said outwardly directed radial surfaces of the sleeve housing thereby to preclude play between the bearing surfaces and the pin and automatically provide for bearing surface and pin wear, a tensioned plate carried by said swivel and disposed to thrust the pin in an axial direction toward said bearing surfaces.

2. In a steering pivot assembly for motor vehicles according to claim 1, including means for selectively setting the tensioning of said plate and the compression of said springs thereby to control the bearing pressure of the pin on its bearing surfaces.

3. In a steering pivot assembly for motor vehicles according to claim 1, in which said plate is tapered in cross section, whereby its flexure characteristics are a function of the degree of taper.

4. In a steering pivot assembly for motor vehicles according to claim 1, in which said steering swivel is provided with a shoe bearing against said axle casing thereby to dampen oscillations of the assembly.

References Cited in the file of this patent

UNITED STATES PATENTS

| 1,568,334 | Hubbard | Jan. 5, 1926 |
| 2,182,012 | Bunnell | Dec. 5, 1939 |
| 2,421,007 | Buckendale | May 27, 1947 |

FOREIGN PATENTS

| 157,069 | Australia | June 15, 1954 |